United States Patent [19]

Kawamata et al.

[11] 3,827,298

[45] Aug. 6, 1974

[54] ELECTROMAGNETIC FLOW METER

[75] Inventors: Isamu Kawamata; Mitsuo Ai, both of Katsuta; Ichiya Satoh, Hitachi, all of Japan

[73] Assignee: Hitachi Ltd., Tokyo, Japan

[22] Filed: Oct. 26, 1972

[21] Appl. No.: 300,890

[30] Foreign Application Priority Data
Oct. 29, 1971 Japan.............................. 46-85505

[52] U.S. Cl............................ 73/194 EM, 335/297
[51] Int. Cl............................................. G01f 1/00
[58] Field of Search .. 73/194 EM; 336/233, DIG. 3; 335/297; 29/607

[56] References Cited
UNITED STATES PATENTS

| | | | |
|---|---|---|---|
| 3,255,512 | 6/1966 | Lochner et al. ................. | 336/233 X |
| 3,446,071 | 5/1969 | Kolin et al. .................... | 73/194 EM |
| 3,527,095 | 9/1970 | Wada............................. | 73/194 EM |
| 3,608,375 | 9/1971 | Cushing ......................... | 73/194 EM |
| 3,610,040 | 10/1971 | Wada............................. | 73/194 EM |

Primary Examiner—Charles A. Ruehl
Attorney, Agent, or Firm—Craig & Antonelli

[57] ABSTRACT

An electromagnetic flow meter utilizing Faraday's law is disclosed. The flow meter transmitter has a magnetic field forming means including a core, which is a cast core made of a ferromagnetic material containing silicon.

9 Claims, 8 Drawing Figures

ELECTROMAGNETIC FLOW METER

This invention relates to field forming means for electromagnetic flow maters utilizing Faraday's law.

The core in the field forming means used in electromagnetic flow meters has heretofore been formed by laminating E-shaped silicon steel plates produced by die stamping. Therefore, the material utilization factor has been low and uneconomical.

Besides, with the laminated core it is very difficult to obtain uniform fields due to structural methods, and this leads to the generation of a noise voltage after assemblage of the field forming means.

An object of the invention is to provide an electromagnetic flow meter, which can overcome the aforementioned drawbacks inherent in the prior-art electromagnetic flow meter using a laminated core, and with which it is possible to ensure effective and economical material utilization, constant loss, readily set up uniform magnetic fields and freedom from generation of noise voltage after assemblage, particularly after disassemblage and reassemblage.

The invention is based on the recognition that the flux density of the magnetic field used in electromagnetic flow meters is usually low, and its feature resides in a cast core, which is either a cast iron cast core or a pure iron cast core or is made by bending at least one rolled pure iron plate or by grinding a pure iron rod or a pure iron pipe or from a ferromagnetic material containing silicon in addition to such elements as nickel and chromium.

Figure 1A:
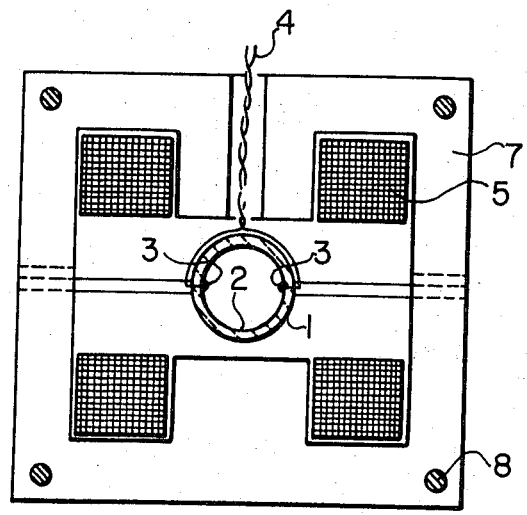
FIGS. 1a, 1b and 1c show a prior-art electromagnetic flow meter.
Figure 1B:
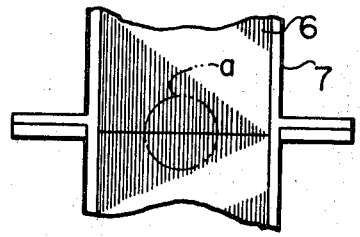
Figure 1C:
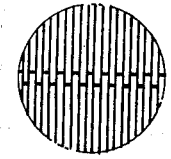

FIG. 1a is a front view of a prior-art electromagnetic flow meter, FIG. 1b is a fragmentary side view of the same flow meter, and FIG. 1c is an enlarged view of a part indicated at a in FIG. 1b. Referring to these Figures, numeral 1 designates a non-magnetic pipe through which conductive fluid flows. Numeral 2 designates a lining provided on the inner surface of the pipe 1, numeral 3 a pair of electrodes, numeral 4 leads leading from these electrodes, numeral 5 an exciting coil, numeral 6 a core, numeral 7 fixing metals, and numeral 8 bolts.

In the exciting portion, usually an E-type core is used as shown in FIG. 1a. Since this type of core is formed by die stamping, its material utilization factor is low, which is uneconomical.

Also, since the core 6 consists of a lamination of thin silicon steel plates fastened by means of bolts 8, the apparent effective core space factor and hence the loss in the individual silicon steel plates varies with the extent of fastening of the nuts on the bolts and fluctuations of the thickness of the insulating film applied on each silicon steel plate. Further, the edge of the magnetic path after assemblage is likely to have an irregular form as shown in FIG. 1c. From the above grounds, with the prior-art magnetic circuit using silicon steel plates it is extremely difficult to obtain a uniform magnetic field, and these individual problems would lead to the generation of noise voltage after assemblage as will be described hereinafter.

Figure 2A:
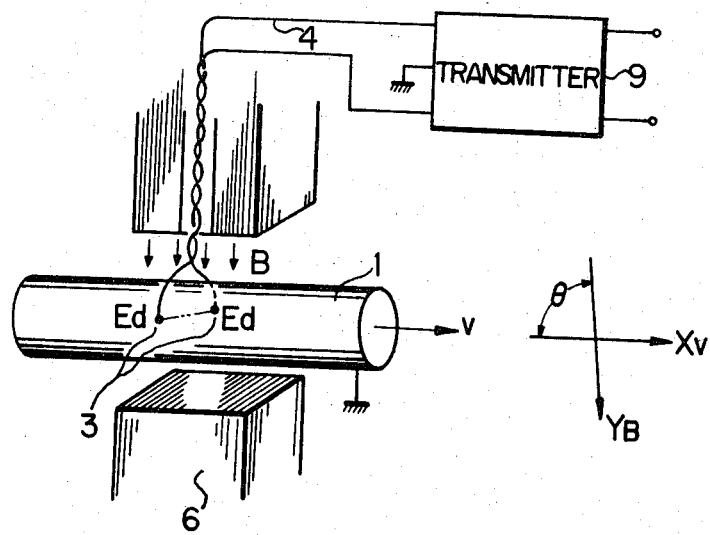
FIGS. 2a and 2b illustrate principles underlying the generation of noise voltages 90° out of phase with the signal voltage.

FIG. 2a shows the principles of generation of noise voltage 90° out of phase with the signal voltage. As is seen, the leads 4 from the electrodes Ed form one turn through the fluid, so that noise voltage is given rise to as magnetic flux links with them. Particularly, this noise generation is caused where the angle $\theta$ between the pipe axis $X_v$ and core axis $Y_b$ representing the field direction is not a right angle. In the Figures, the same reference numerals as in FIG. 1 designate like parts. Numeral 9 designates a transmitter.

Figure 2B:
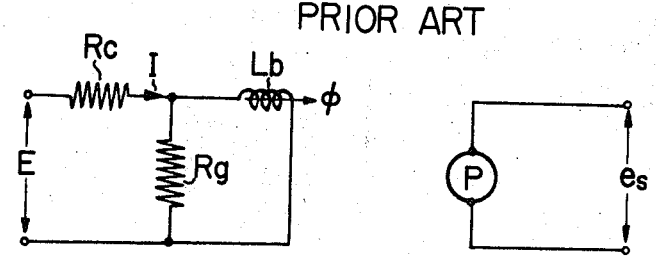

FIG. 2b shows an equivalent circuit for the system of FIG. 2a. In the Figure, reference character $R_c$ designates exciting coil resistance, character $R_g$ loss resistance, character $L_b$ exciting coil inductance, character $\phi$ magnetic flux, character P pipe, and character $e_s$ signal voltage.

In another aspect, with the laminated core it is difficult to obtain interchangeability between generator and transmitter due to the afore-mentioned fluctuations and irregularities.

As has been shown, while the prior-art laminated core has an inherent merit in that loss is small, it has a demerit in that it is difficult to obtain a uniform field due to structural methods.

The cast core, on the other hand, is mechanically very strong and easily processible, but it has a problem in that $\epsilon f$ due to iron loss tends to be large. This means that the cast core would be preferred if this problem could be solved. The output of an electromagnetic flow meter transmitter is usually given as the ratio between flow signal voltage and exciting current, and the value $\epsilon f$ when the source frequency is changed from $f_1$ to $f_2$ is given, with reference to FIG. 2b, from an equation $$\epsilon f = \{R_g^2 + (2\pi f_1 L_b)^2 / R_g^2 + (2\pi f_2 L_b)^2 - 1\} \times 100 \ (\%) \quad (1)$$

To reduce $\epsilon f$ in equation (1) the loss resistance $R_g$ may be increased, and to this end the iron loss should be reduced. Among the iron losses (hysteresis loss, eddy current loss), it is eddy current loss that constitutes a problem. The eddy current loss $W_e$ is given as $$W_e = Kf^2 Bm^2 t^2 / \rho \quad (2)$$

where $f$ is frequency, $t$ is core thickness, $\rho$ is resistivity of the core, $Bm$ is flux density and $K$ is a proportionality constant.

It will be seen from equation (2) that to make $W_e$ small it is necessary to select the core material such that $t$ is small and $\rho$ is large, since $Bm$ depends upon the aperture of the electromagnetic flow meter. In the case of electromagnetic flow meters, the flux density is low, so that with a flow meter aperture of, for instance, 25 mm the core thickness may be made as small as about 5 mm, and the resistivity $\rho$ of the core may be increased by the incorporation of nickel, chromium and silicon and spheroidizing of carbon, whereby reduction of the eddy current loss $W_e$ may be achieved. The following table lists characteristic values of an example with a flow meter aperture of 25 mm.

TABLE

| | |
|---|---|
| Inductance $L_b$: | 248 mH |
| Loss resistance $R_o$: | 512 ohms |
| Iron loss $R_i$: | 18.5 W |
| $\epsilon f$ effect: ± 0.19 percent (for a change of ± 2 Hz) | |

In this example, $\epsilon f$ is within ± 0.2 percent for a change of ± 2Hz, and it will lead to no practical problems.

With a structure integrally having core and coil to be described hereinafter, it is possible to provide an electromagnetic flow meter where the value of $\epsilon f$ due to assemblage and disassemblage is with ± 0.3 percent.

In practice, $\epsilon f$ is no problem if it is within ± 0.5 percent for a change of ± 2 Hz. A preferred composition of the field forming portion to obtain the above characteristic values will be 96.1 percent iron, 3.5 percent silicon, 4.0 percent spheroidized carbon, 0.9 percent manganese, and slight quantities of nickel and chromium. The incorporation of nickel and chromium gives good effect upon the improvement of the characteristics.

Figure 3:
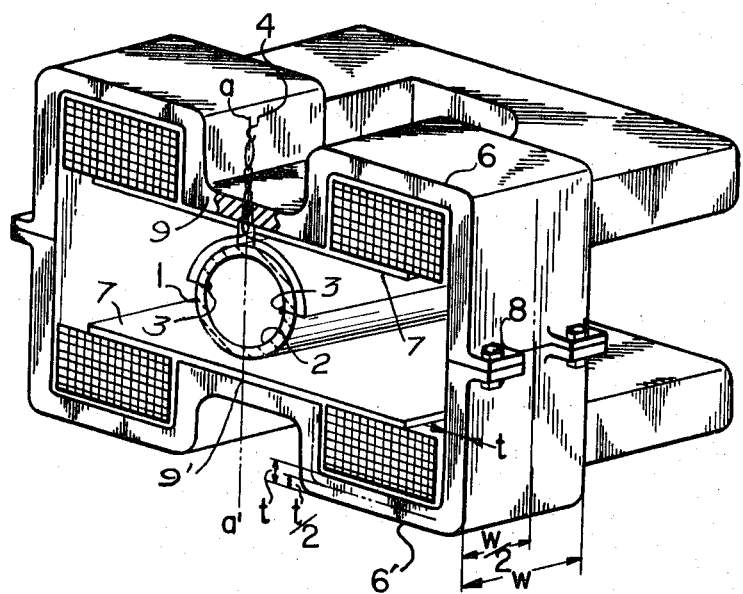
FIG. 3 shows an embodiment of the invention.

An embodiment of the invention will now be described with reference to FIG. 3. FIG. 3 shows the construction. The same reference numerals as those in FIG. 1 designate like parts.

As is shown, according to the invention the portions of the core where the magnetic fluxes emerge therefrom or return thereto is constructed such that the magnetic reluctance is distributed symmetrically with respect to line $a-a'$ in FIG. 3, with pole faces 9,9' opposing and extending parallel to each other for impressing the magnetic field in the vertical direction of the pipe are machine finished to eliminate surface irregularities, and is formed such as to minimize the magnetic path length $l$.

Also, according to the invention the exciting coil 5 is held integral with the core or outer core 6, which, unlike the prior-art electromagnetic flow meters, is made of cast iron cast core or pure iron cast core or is made by bending at least one rolled pure iron plate or by grinding a pure iron rod or a pure iron pipe or from a ferromagnetic material containing silicon in addition to such elements as nickel and chromium. The relative positions of the coil 5 and core 6 are fixed by fixing metals 7.

In this embodiment, the core consists of two parts, namely upper and lower halves, extending along the pole faces forming the field. This construction is advantageous in that the lower core half with the associated coil can be removed in the integral state, with the upper half provided with signal take-out leads held fixed, by merely loosening nuts on bolts 8, and at the time of reassemblage the characteristics before the disassemblage can be readily reproduced. Another advantage is that by virture of the integral arrangement of the core and exciting coil, the field will not be prone to irregularities or variations.

It is to be emphasized that according to the invention it is essentially possible to reproduce various electric characteristics because of the capability of machining the core.

Also, according to the invention a uniform field may be readily obtained with extremely small field fluctuations.

Figure 4A:
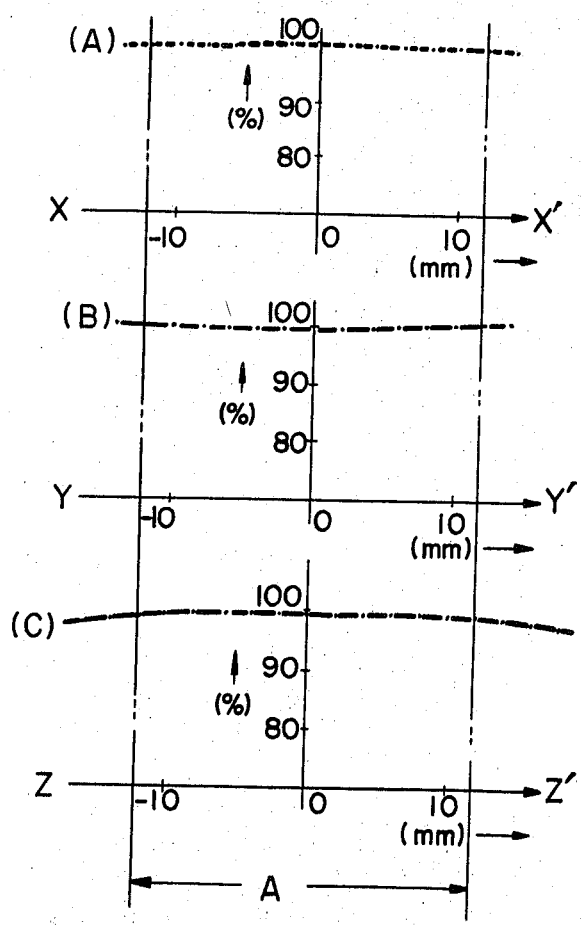
FIGS. 4a and 4b show flux distributions obtained with the electromagnetic flow meter of FIG. 3.
Figure 4B:
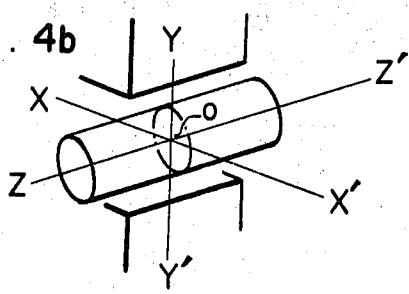

FIGS. 4a and 4b show flux distributions of a 25-mm aperture electromagnetic flow meter according to the invention along three perpendicular axes $X-X'$, $Y-Y'$ and $Z-Z'$ intersecting at the origin O as shown in FIG. 4b. In the case of the 25-mm electromagentic flow meter, it is practically sufficient if the field is uniform over a region as indicated at A.

Further, since the core according to the invention is a single cast core or may be made of cast steel or pure iron, the material control to uniformalize the loss can be readily done.

The illustrated configuration of the core is not given in a limitative sense, but it is possible to have a ring-like cast core form. Also, the opposing pole faces need not be parallel to each other.

Further, the core construction consisting of upper and lower core halves 6 and 6' shown in FIG. 3 is by no means limitative, but any other suitable core construction consisting of at least two parts may be employed provided that the disassemblage and reassemblage are possible.

Furthermore, the construction of FIG. 3 even permits the use of usual silicon steel plates. For example, two or three steel plates thicker than 0.35 to 0.5 mm and thinner than 5 to 6 mm may be used in the stacked form. Still further, the core dimension in the direction of the pipe, that is, core width $w$, need not be constant. In other words, the core may consist of a plurality of sections with a width of $w$, $w/2$, $w/3$, etc. At any rate, it is possible to readily form a uniform field with a simple construction compared to the prior-art laminated core.

Further, the invention may as well be applied where field intensities as high as 1,000 to 2,000 gauss are dealt with and to large aperture electromagnetic flow meters, for instance with an aperture of 1,000 mm. Furthermore, the elements that are to be incorporated to increase the resistivity of the cast core are not limited to nickel, chromium and silicon alone, but any other suitable element may be incorporated. Moreover, through the incorporation of spheroidized carbon into the cast core it is possible to obtain electromagnetic flow meters with a cast core having improved wear resistance, heat resistance and mechanical strength as well as increased resistivity.

As has been described in the foregoing, according to the invention the intended results may be fully achieved not with a laminated core but with a cast core or the like.

What is claimed is:

1. An electromagnetic flow meter comprising a pipe through which a fluid is adapted to flow, magnetic means for applying magnetic fluxes to the fluid in a direction substantially perpendicular to the direction of flow of the fluid through said pipe and a pair of electrodes electrically connected to the fluid for detecting an electrical signal relating to the flow rate of the fluid through said pipe, said magnetic means including a magnetic core and an exciting coil integrally mounted in said magnetic core, said magnetic core being a cast core of a ferromagnetic material containing silicon.

2. The electromagnetic flow meter according to claim 1, wherein said ferromagnetic material further contains at least one of manganese and chromium.

3. The electromagnetic flow meter according to claim 1, wherein said ferromagnetic material further contains spheroidized carbon.

4. The electromagnetic flow meter according to claim 1, wherein said magnetic core is formed to surround said pipe substantially symmetrically with respect to the center of said pipe.

5. The electromagnetic flow meter according to claim 4, wherein said core has a pair of pole faces for applying the magnetic fluxes, said pole faces extending parallel to each other.

6. The electromagnetic flow meter according to claim 1, wherein said magnetic core comprises two portions which are mounted therein integrally with respective portions of said coil and are detachably connected to each other together with the associated portion of said exciting coil.

7. The electromagnetic flow meter according to claim 1, wherein said magnetic core comprises two portions each having a pole face, said two portions being detachably connected to each other along a sectional plane extending in the direction parallel to the surface of said pole face.

8. The electromagnetic flow meter according to claim 7, further comprising metal plate members extending outwardly beyond each pole face for positioning and securing said exciting coil within said magnetic core.

9. The electromagnetic flow meter according to claim 1, wherein said ferromagnetic material comprises iron.

* * * * *